United States Patent Office 3,513,057
Patented May 19, 1970

3,513,057
METHOD OF ADHERING OLEFIN COPOLYMERS TO NATURAL AND SYNTHETIC MATERIALS
Luigi Falcone, Como, and Mario Milano, Ferrara, Italy, assignors to Montecatini Edison S.p.A., Milan, Italy
No Drawing. Filed Nov. 10, 1964, Ser. No. 410,278
Claims priority, application Italy, Nov. 11, 1963, 23,418/63
Int. Cl. C09j *3/12;* C08d *13/24*
U.S. Cl. 156—333   1 Claim

ABSTRACT OF THE DISCLOSURE

Improved process for bonding textile fiber to elastomeric ethylene/higher alpha-olefin copolymer comprising coating fiber with a single aqueous dispersion of phenol/aldehyde resin and latex of chlorosulfonated ethylene/higher alpha-olefin copolymer containing from about 0.1 to 5% by weight thereof of sulfur and from about 1 to 40% by weight thereof of chlorine and a surface active agent consisting of a mixture of a nonionic surfactant and an anionic surfactant, the aqueous dispersion having been allowed to stand from 40 to 80 hours and having a pH from about 7 to 8; after coating fiber with aqueous dispersion, coated fiber is dried and elastomeric ethylene/higher alpha-olefin copolymer composition containing vulcanizing agents is contacted therewith and vulcanized in the usual manner.

---

This invention is directed to a process for the adhesive bonding of elastomeric ethylene-alphaolefin copolymers to natural or synthetic fibers and other shaped articles prepared therefrom. More particularly, this invention is directed to a process for obtaining the adhesion of elastomeric, saturated, amorphous ethylene-propylene or ethylene-butene copolymers to fibers, fabrics, yarns, cords of cotton, nylon, polyesters and cellulose fibers. The adhesion is accomplished by treating the fibers with a composition comprising a chlorosulphonated ethylene-propylene copolymer and a phenolaldehyde resin which is subsequently covulcanized with a layer of the elastomeric material.

In the preparation of articles comprising a rubbery layer and a substrate consisting essentially of cellulose fibers, for example, it is very difficult to obtain good adhesion between the two materials even under the most drastic heating conditions due to dynamic stresses. The problems of obtaining good adhesion are encountered in the manufacturing, for example, of tires, belt conveyors, driving belts, rubber-coated fabrics, etc. This problem of adhesion between a rubber layer and a textile substrate varies in each case, however, and depends on the type of rubber and on the fabric being used. Thus, the problems and the techniques used for solving them also applies to the synthetic elastomeric materials consisting of the copolymers of ethylene with propylene or butene-1.

These copolymers are prepared with the aid of suitable catalytic systems comprising a transition metal compound and an organometallic compound. The copolymers are characterized as being completely amorphous, free of unsaturation, and free of substituents having a polar character. It is these characteristics of the copolymers which makes them exceptionally resistant to ageing, to oxidation and to chemical reagents. It is these same characteristics, however, which makes it necessary to find new vulcanizing agents for the cross-linking of the polymer in order to obtain the mechanical and elastic properties required. The known vulcanization systems comprising sulphur, accelerators, etc., are completely ineffective for vulcanizing these copolymers. It is the absence of the reactive points or polar groups in the macromolecules which makes it extremely difficult and almost impossible to attach the copolymer to other known rubbers and more particularly to the unsaturated rubbers such as the natural and synthetic fibers. Heretofore, applicants were able to overcome the problems of making copolymers of ethylene and higher alphaolefins, e.g. ethylene-propylene copolymers, adhere to textile fibers by using an adhesive solution of a chlorosulphonated copolymer. Thus, because of the polar character of the chlorosulphonic substituents introduced into the macromolecules, it was possible to adhere the copolymer to the fibers.

Normally, the techniques used in coating fibers with rubber involved the use of aqueous mixtures rather than organic solutions. The organic solutions are dangerous because of their inflammability and volatility and due to their formation of explosive mixtures with air. In the case of natural and synthetic rubbers, however, which can be prepared in the form of an aqueous latex there is no such problem. In the case of non-dienic rubbers, it is often difficult to obtain aqueous emulsions which are stable and resistant to mechanical stresses and to variations of temperatures. Nevertheless, the aqueous latexes have an advantage in that they are miscible and compatible with aqueous solutions of phenol-aldehyde resins, e.g. Novolack, which are used normally for increasing the adhesion between rubber and other types of fibers.

Generally, stable aqueous latexes cannot be prepared from ethylene-alphaolefin copolymers and more particularly copolymers of ethylene and propylene or copolymers of ethylene and butene-1. The reason is that these copolymers are prepared from catalytic systems which are incompatible with water and therefore cannot be prepared in an aqueous emulsion. By starting with a hydrocarbon solution, however, it is possible to obtain emulsions of the oil-in-water type if prepared in the presence of a suitable surface-active agent. Generally, these emulsions are prepared by using an agitator such as an ultrasonic or a high-speed stirrer. The oil-in-water type emulsions, however, undergo coagulation when the solvent is removed. Moreover, there is a tendency for the organic phase to separate from the aqueous phase over a period of time.

Accordingly, it is an object of this invention to provide a process for obtaining the adhesion of ethylene-alphaolefin copolymers to natural and synthetic fibers by using solvent-free aqueous latexes.

It is another object of this invention to provide a process for adhering natural and synthetic fibers to elastomeric, saturated, amorphous copolymers of ethylene and higher alphaolefins.

It has been discovered, quite unexpectedly, that aqueous emulsions free from solvents can be obtained which are stable and have a relatively high concentration of solids. These aqueous emulsions are prepared, by normal techniques, from a chlorosulphonated ethylene-alphaolefin copolymer in a hydrocarbon solution in the presence of a surface-active agent. These chlorosulphonated-copolymer latexes may be added to an aqueous mixture of a phenol-aldehyde resin and used without any difficulty on natural and synthetic textile fibers. Thus, it is possible in accordance with this invention to provide a means of adhering an ethylene-alphaolefin copolymer in a natural or synthetic fiber by pre-treating or coating said fibers with an aqueous dispersion comprising (1) a phenol-aldehyde resin and (2) an aqueous latex containing a chlorosulphonated ethylene-alphaolefin copolymer. In addition, the aqueous latex contains a combination of a nonionic surfactant and an anionic surfactant with the pH of the resin-latex dispersion being adjusted to about 7–8 after a period of about 40–48 hours.

A layer of material comprising an ethylene-alphaolefin copolymer, vulcanizing agents and reinforcing fillers is applied onto the coated fibers which are then vulcanized by heating to temperatures ranging from about 110–220° C. The chlorosulphonated-copolymer latexes of this invention are prepared by mixing, with agitation, a hydrocarbon solution containing from about 1–30% by weight of the chlorosulphonated copolymer with a solution having the same amount of water containing a mixture of a nonionic surfactant and an anionic surfactant. The chlorosulfonated ethylene-alpha olefin copolymer may contain from 0.1% to 5% by weight of sulfur and from about 1% to 40% by weight of chlorine.

Particularly good results have been obtained by using any of the known surfactants including, for example, a mixture of a nonionic surfactant selected from the group consisting of the polyoxyethylated alkyl phenols and the polyoxyethylated alcohols and an anionic surfactant selected from the group consisting of sodium lauryl sulphate, sodium salts of polyoxyethylated phenols and the sodium or potassium oleates, palmitates and stearates. The polyoxyethylated alkyl phenols are the condensation products of 6–10 mols of ethylene oxide with about 1 mol of an alkyl phenol having an aliphatic chain of 1–10 carbon atoms. These condenssation products are known commercially as Triton X–100, Triton X–45 and Igepal CO–430. The polyoxyethylated alcohols are characterized by the formula $R(OCHR'CHR')_nOH$ wherein R is an alkyl, R' is a hydrogen or an alkyl and $n$ is a number ranging between 4 and 10. These products, likewise, are known commercially as the Pluronic series such as Pluronic F–68.

The hydrocarbons used as the solvent for the chlorosulphonated copolymers are preferably the relatively volatile aliphatic or aromatic hydrocarbons which include, for example, pentane, hexane, heptane, benzene, toluene, etc.

The nonionic and anionic surface-active agents are used in amounts ranging from about 1–30 parts by weight per 100 parts by weight of the chlorosulphonated copolymer. This latex emulsion can be prepared at room temperature without any difficulty with normal agitation. If desired, a thickening agent such as carboxymethylcellulose may be added to the latex emulsion, but it was found that "skimming" was obtained. Skimming is an enriched portion of the emulsion containing about ½ to ⅔ of the original emulsifiers present and can be separated from the aqueous layer. Thus, where a thickening agent is used the amount of surface-active agent added to the emulsion is such that approximately 1–30% by weight of the surfactants are left remaining in the final latex composition. The solvent can be separated from the enriched emulsion by distillation by using a current of overheated steam. The emulsion can be further concentrated by evaporating off the water to a solid content of 20–30%.

In preparing the aqueous dispersion, the polyvalent phenol and aldehyde may be reacted in situ by adding them to the latex of chlorosulphonated copolymer with a small amount of an alkali compound such as sodium or potassium hydroxide which acts as the catalyst for the condensation reaction. On the other hand, the condensation of the phenol and aldehyde may be carried out separately and then left standing for a time so as to obtain a suspension which is then added to the latex mixture. The amount of the phenol-aldehyde, e.g. formaldehyde, resin to be present in the aqueous dispersion ranges from about 1–10% by weight and the chlorosulphonated copolymer is present in an amount ranging from about 10–20% by weight with the remaining being the water and the residual surface-active agents.

Of the many phenols that can be used in preparing the resin, the polyvalent phenols such as resorcinol are preferred. The molar ratio of the aldehyde to resorcinol may vary from about 1.5:1 to 10:1. Particularly important for obtaining good results is the time of maturation of the resin in the presence of the latex and the reaction medium. It has been found that in order to obtain improved adhesion between the coated fiber and the copolymer the suspension should be allowed to mature for about 40–80 hours. During this period, the pH value which at the beginning is slightly alkaline tends to decrease. However, the pH should not be allowed to decrease below 7. It has been found that it may be necessary to add boric acid and caustic soda to the suspension so as to form sodium borate which acts as a buffering agent and maintains the reaction medium between a pH of 7 and 8.

The ethylene-alphaolefin copolymers can be prepared by known methods by using catalysts soluble or dispersed in hydrocarbons. These catalytic systems consist of a transition metal compound such as a vanadium compound and an organometallic aluminum compound. Specific examples of the preferred catalytic components include vanadium tetrachloride, vanadium oxychloride and vanadium acetylacetonate. The organometallic aluminum compounds include aluminum triethyl, aluminum triisobutyl and aluminum diethyl monochloride. Particularly preferred are the copolymers of ethylene with propylene or butene-1 wherein the ethylene content ranges from 20–80% by mols and the molecular weight ranges from about 50,000 to 500,000.

The chlorosulphonated ethylene-alphaolefin copolymers are prepared by chlorosulphonating the above copolymers. The chlorosulphonation can be obtained with gaseous mixtures of $SO_2$ and chlorine or with chlorosulphonic acid, sulphuryl chloride, etc. The chlorosulphonation may take place in solutions of halogenated hydrocarbons or in the dry state according to methods per se well known.

The copolymers to be applied to the synthetic or natural fibers may include those prepared from ethylene, propylene or butene-1.

The fibers and fabrics including nylon, cotton, polypropylene, etc. are coated with the aqueous dispersion in accordance with this invention by treating them in a conventional manner such as, for example, by immersion, spreading, friction, etc. The treated fibers are then dried in air until they obtain a constant weight. These treated fibers are contacted by methods well known in the art with the copolymers which contain the vulcanizing agents, e.g. an organic peroxide as the free-radical generator and a free-radical acceptor, i.e. sulphur and if desired reinforcing fillers and other additives. The entire assembly is then heated for purposes of vulcanization to temperatures ranging from about 110–200° C. and more preferably between 140–180° C. according to well known vulcanization processes. The adhesion obtained between the copolymer and the fibers is sufficiently strong at room temperature, but more important the adhesion is very satisfactory at temperatures up to 90° C. and higher. The fillers used for reinforcing the ethylene-alphaolefin copolymer are those normally used and include such materials as carbon black and/or mineral fillers. The organic peroxide is added in amounts ranging from about 0.1 to 10 parts by weight per 100 parts by weight of the copolymer with the sulfur being added in amounts less than 50% by weight of the amount of peroxide used.

The following examples are given as illustrations of the process and the products obtained in accordance with this invention.

The chlorosulphonated copolymer was prepared from the corresponding non-substituted copolymer in the following manner. An ethylene-propylene copolymer having an ethylene molar content of about 55% by weight and a Mooney viscosity ML (1+4) at 100° C. of 25 was dissolved in an amount of 5% in carbon tetrachloride. A current of sulfur dioxide (10 liters/hour) and chlorine (2 liters/hour) was passed through the solution which was lighted with actinic light. The sulfur dioxide and chlorine was bubbled through the solution for about 2 hours. The temperature gradually raised from 25 to 50° C. At the end of the chlorosulphonation reaction, the copolymer was precipitated by adding methanol-acetone in a 1:1 mixture, to the reaction mass. This mass was filtered and dried at 40° C. under nitrogen until a constant weight was obtained. The chlorosulphonated copolymer had a viscosity ML (1+4) at 100° C. of 60 and contained 2.1% by weight combined chlorine and 1.0% by weight of combined sulfur.

EXAMPLE 1

(a) The following is a method of preparing the latex of chlorosulphonated copolymer:

A solution was prepared which contained about 2.5% by weight of a chlorosulphonated ethylene-propylene copolymer in heptane. An aqueous solution containing 0.75% by weight of Triton X-100 (polyoxyethylene octylphenol) and 0.075% by weight of sodium lauryl sulphate was also prepared. One volume of the heptane solution was gradually mixed, with agitation, with about one volume of the aqueous solution of the surface-active agents. The mixture was agitated for about 1 hour. About 0.05% by weight of carboxymethylcellulose per 100 parts of the emulsion was then added as a thickening agent and the entire mixture was left to stand for 48 hours.

The aqueous solution was decanted and was found to contain about 45 g. of water and 1.3% by weight of dry residue which was prevailingly sodium lauryl sulphate. The residual emulsion was subjected to distillation with an overheated current of steam until all of the solvent was removed. The residual latex was concentrated without any coagulation by evaporation in an open flask on a water-bath to a concentration of about 30% of solid. This emulsion also contained about 3% by weight of the above surface active agents.

(b) The adhesive mixture was prepared as follows:

A mixture consisting essentially of:

| | Parts by weight |
|---|---|
| Water | 66.4 |
| Resorcinol | 22 |
| 35% formaldehyde | 23 |
| 30% NaOH | 2.5 | was prepared and matured at room temperature for about 2 hours. About 62.5 g. of a buffer solution prepared by dissolving 1.24 g. of boric acid and 0.24 g. of NaOH in 100 g. of water together with about 100 g. of the above-mentioned chlorosulphonated copolymer latex containing about 30% by weight of solids was then added to the adhesive phenol-formaldehyde mixture. This mixture was left to stand for progressively increasing periods of time and was used in the adhesive test described as follows:

The adhesive characteristics of the composition was tested by applying it to rayon cord. A square fabric of commercial rayon normally used for the manufacture of tires was immersed into the adhesive mixture which had matured for various periods of time as indicated in the following table and then dried at 80–120° C. in an oven. The amount of solids absorbed by the fabric was measured by the increase in weight and was found to be about 5–7% by weight of the fiber. A layer of copolymer having the following composition was then applied onto the adhesive-treated fiber. The layer of copolymer consist essentially of an ethylene-propylene copolymer having an ethylene molar content of about 55% and a Mooney viscosity ML (1+4) at 100° C. of 35. A specific example of the layer of copolymer consisted of 100 parts by weight of said ethylene-propylene copolymer, 50 parts by weight of carbon black (ISAF), 2.6 parts by weight of dicumyl peroxide and 0.32 part by weight of sulfur. The assembled material comprising the fiber treated with the adhesive and containing a layer of the copolymer was then vulcanized in a press at 160° C. for about 60 minutes. The specimens obtained from the vulcanized product were subject to peeling tests according to ASTM D–413–39. The results of these tests are in the following table.

TABLE 1

| Maturation time of the adhesive mixture, hours | Final pH of the adhesive mixture | Adhesion values, peeling method, kg./cm. at— | | |
|---|---|---|---|---|
| | | 25° C. | 75° C. | 90° C. |
| 0 | 9 | 3.3 | 2.3 | 1.1 |
| 24 | 7.5 | 7.7 | 4.3 | 3.3 |
| 48 | 7 | 8.2 | 4.8 | 3.8 |
| 120 | 6.5 | 6.3 | 4.5 | 3.5 |
| 168 | 6 | 5.4 | 4.0 | 3.3 |

For purposes of comparison, a test was carried out by using an adhesive mixture containing a natural rubber. This adhesive mixture was then spread onto a square of rayon fabric. The treated fabric was then made to adhere to a composition comprising natural rubber.

The aqueous mixture used in preparing the adhesive comprised:

| | Parts by weight |
|---|---|
| Water | 91 |
| Resorcinol | 11 |
| 35% formaldehyde solution | 11.5 |
| 30% NaOH | 1.0 |

This solution was matured at room temperature for about 2 hours and about 86.4 g. of a latex which contained 65% by weight of a natural rubber was then added to the phenol-formaldehyde mixture with agitation. After maturation for about 24 hours, the mixture was spread onto the fabric which was then dried. The treated fabric was placed onto a layer of natural rubber having the following composition:

| | Parts by weight |
|---|---|
| Natural rubber (ML (1+4) at 100° C. (35–40) | 100 |
| Antioxidant 2246 (2,2-methylene-bis-4-methyl-6-tert. butyl-phenol) | 1 |
| Carbon black ISAF | 50 |
| ZnO | 5 |
| Stearic acid | 3 |
| Diphenylguanidine | 0.5 |
| Santocure | 1 |
| Sulphur | 2 |

The entire assembly comprising the fabric coated with the adhesive containing the rubber and the layer of natural rubber was then molded at 150° C. for about 40 minutes. The peeling tests as mentioned above gave results of about 5.0 kg./cm. at 25° C. and about 3.5 kg./cm. at 90° C.

EXAMPLE 2

The method as set forth in Example 1 was repeated except that the phenol-aldehyde/latex mixture was matured for 48 hours. The adhesive composition was spread onto a square of nylon fabric and then molded with a layer of copolymer as taught in Example 1. The peeling test values were approximately 10 kg./cm. at room temperature and 7 kg./cm. at 90° C.

EXAMPLE 3

The method set forth in Example 2 was used again on a square of cotton fabric (9 yarns/cm. diameter 0.81 mm.). The peeling tests values were about 12 kg./cm. at 25° C. and 6 kg./cm. at 90° C.

While this invention has been described with respect to a number of specific embodiments, it is obvious that there are many other modifications and variations which can be made without departing from the spirit of the invention, except as more particularly pointed out in the appended claim.

What is claimed is:

1. In the process for bonding a textile fiber selected from the group consisting of cotton, rayon, polypropylene, polyamides and polyesters to a saturated, amorphous, elastomeric copolymer of ethylene with a higher alpha olefin selected from the class consisting of propylene and butene-1, said copolymers having an ethylene content ranging from 20% to 80% by mols and molecular weight ranging from 50,000 to 500,000, comprising coating said fiber with a mixture containing a phenol aldehyde resin, a chlorosulfonated ethylene-propylene copolymer, a vulcanizing agent of an organic peroxide and sulfur, and a filler, and vulcanizing said composition while in contact with said fiber by heating at a temperature in the range of from about 110° to 220° C., the improvement wherein said fiber is coated in one application with an organic solvent-free aqueous dispersion consisting of an aqueous solution of a resorcinol-formaldehyde resin having a resorcinol-formaldehyde molar ratio ranging from 1.5:1 to 10:1 and a latex consisting essentially of water and a chlorosulfonated ethylene-propylene copolymer, said copolymer containing about 2.1% by weight of combined chlorine and about 1.0% by weight of combined sulfur, the latex of the chlorosulfonated ethylene-propylene copolymer having been prepared from an organic solvent solution of the copolymer, a carboxymethyl cellulose thickening agent and a surface active agent consisting of a mixture of a nonionic surfactant selected from the group consisting of polyoxyethylated alkyl phenols and polyoxyethylated alcohols having the formula R(OCHR'CHR')$_n$OH, wherein R is an alkyl group, R' is hydrogen or alkyl, and $n$ is a number between 4 and 10, and an anionic surfactant selected from the group consisting of sodium lauryl sulfate, sodium salts of polyoxyethylated phenol sulfates, sodium oleates, sodium palmitates, sodium stearates, potassium oleates, potassium palmitates and potassium stearates, said aqueous dispersion consisting essentially of 10–20% by weight thereof of said chlorosulfonated copolymer, 1 to 10% by weight thereof of said resorcinol/formaldehyde resin, and 1–30 parts by weight of said surface active agent per 100 parts of said chlorosulfonated copolymer, said aqueous dispersion having stood for about 40 to 80 hours after admixture of its ingredients and the pH of said aqueous dispersion being about 7 to 8 at the end of said standing period and prior to the application thereof to said fiber.

References Cited

UNITED STATES PATENTS

| 2,630,398 | 3/1953 | Brooks et al. | 156—333 |
| 2,879,261 | 3/1959 | Johnson et al. | 260—88.2 |
| 2,968,637 | 1/1961 | Bowers | 260—79.2 |
| 3,276,948 | 10/1966 | Gallagher | 161—227 |

FOREIGN PATENTS

Du Pont, E. I and Co. "Paint Bulletin PB–8 (December 1959), "Compatibility of Hypalon with Paint Resins and Oils, pp. 2, 6 and 7 cited.

ROBERT F. BURNETT, Primary Examiner

R. J. ROCHE, Assistant Examiner

U.S. Cl. X.R.

117—138.8, 143, 145; 156—110, 335; 161—254, 256; 260—29.6